Jan. 22, 1957      R. E. SELTZER      2,778,535

AGRICULTURAL MATERIAL DISTRIBUTOR

Filed March 11, 1953      6 Sheets-Sheet 1

*INVENTOR.*
ROBERT E. SELTZER
BY
ATTORNEYS

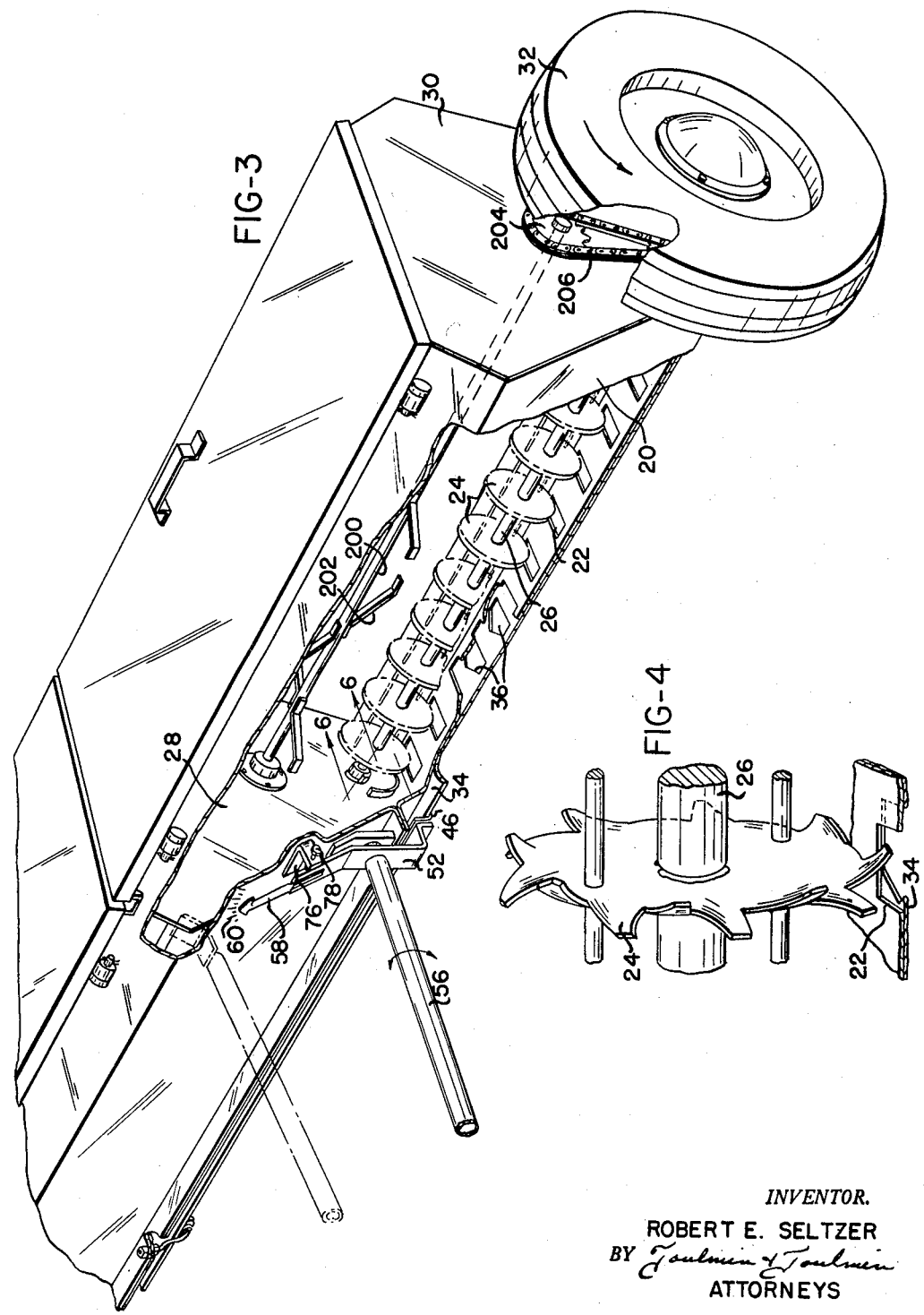

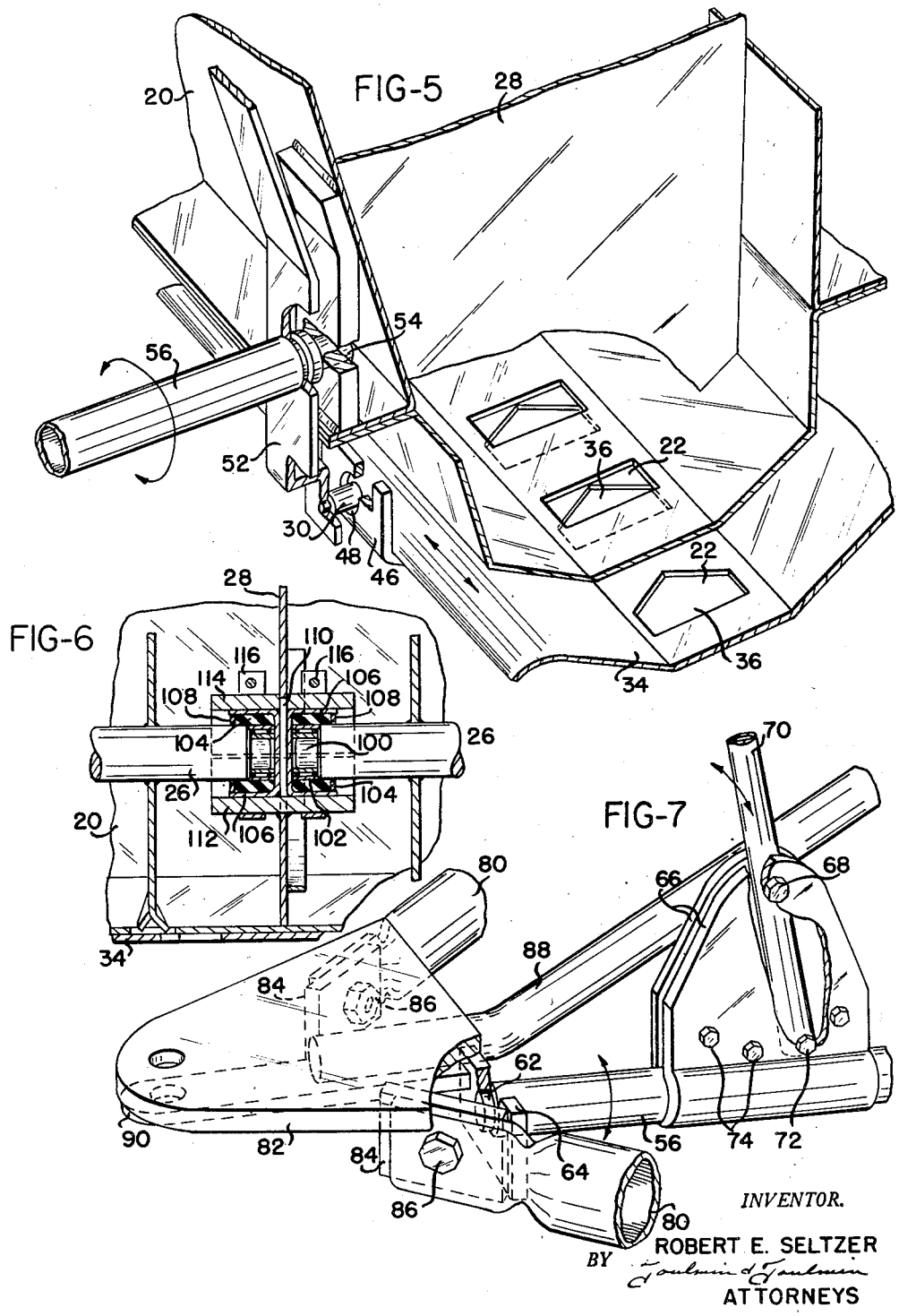

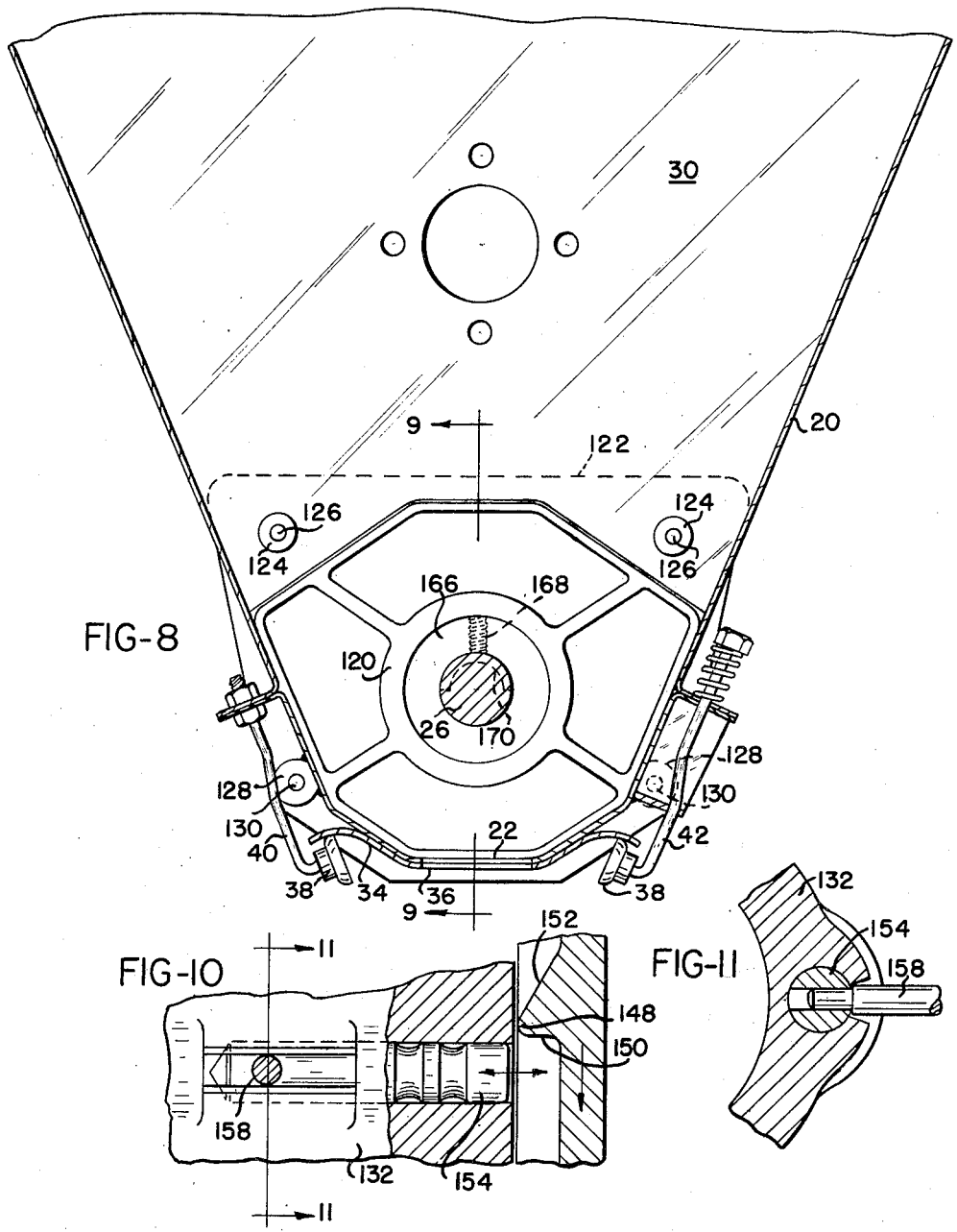

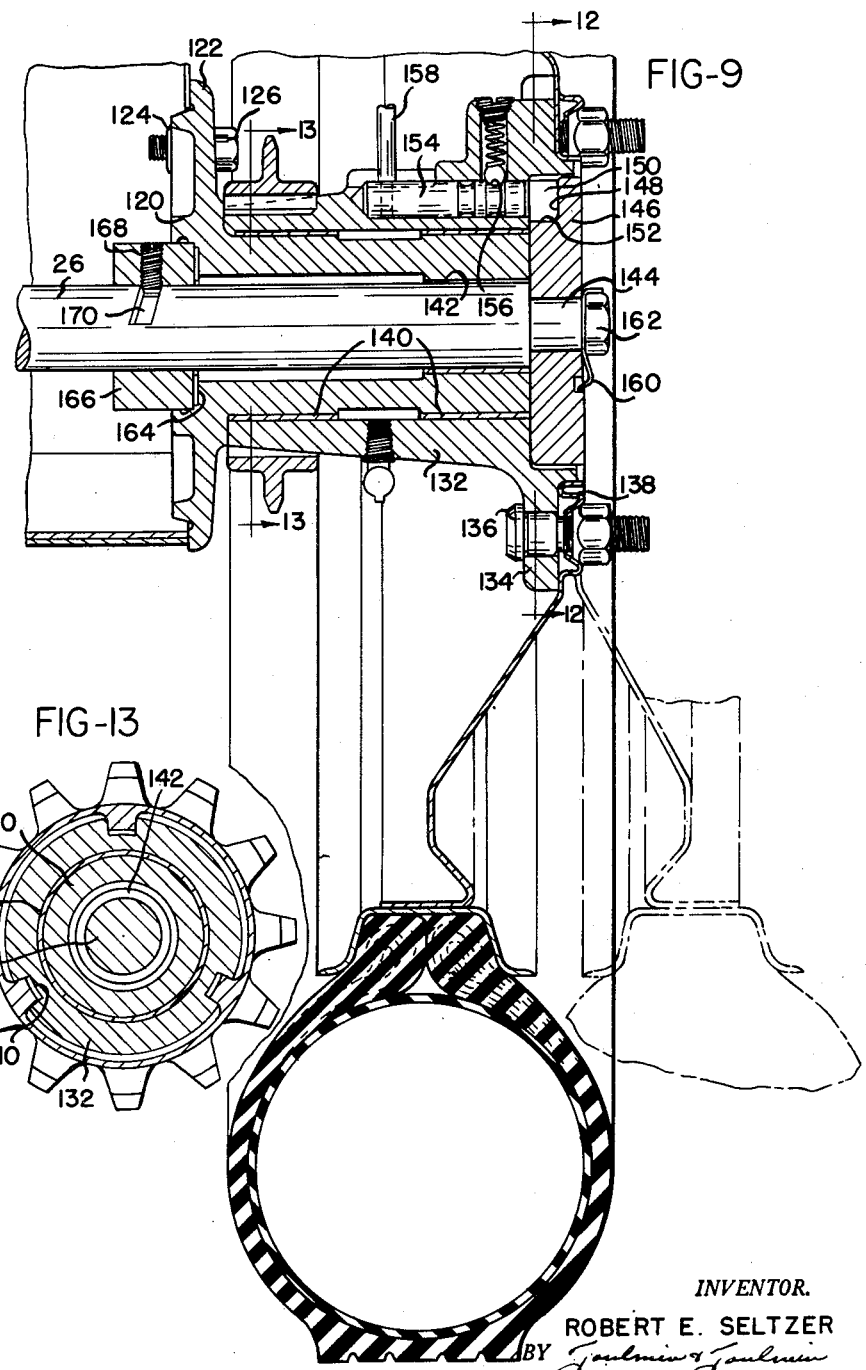

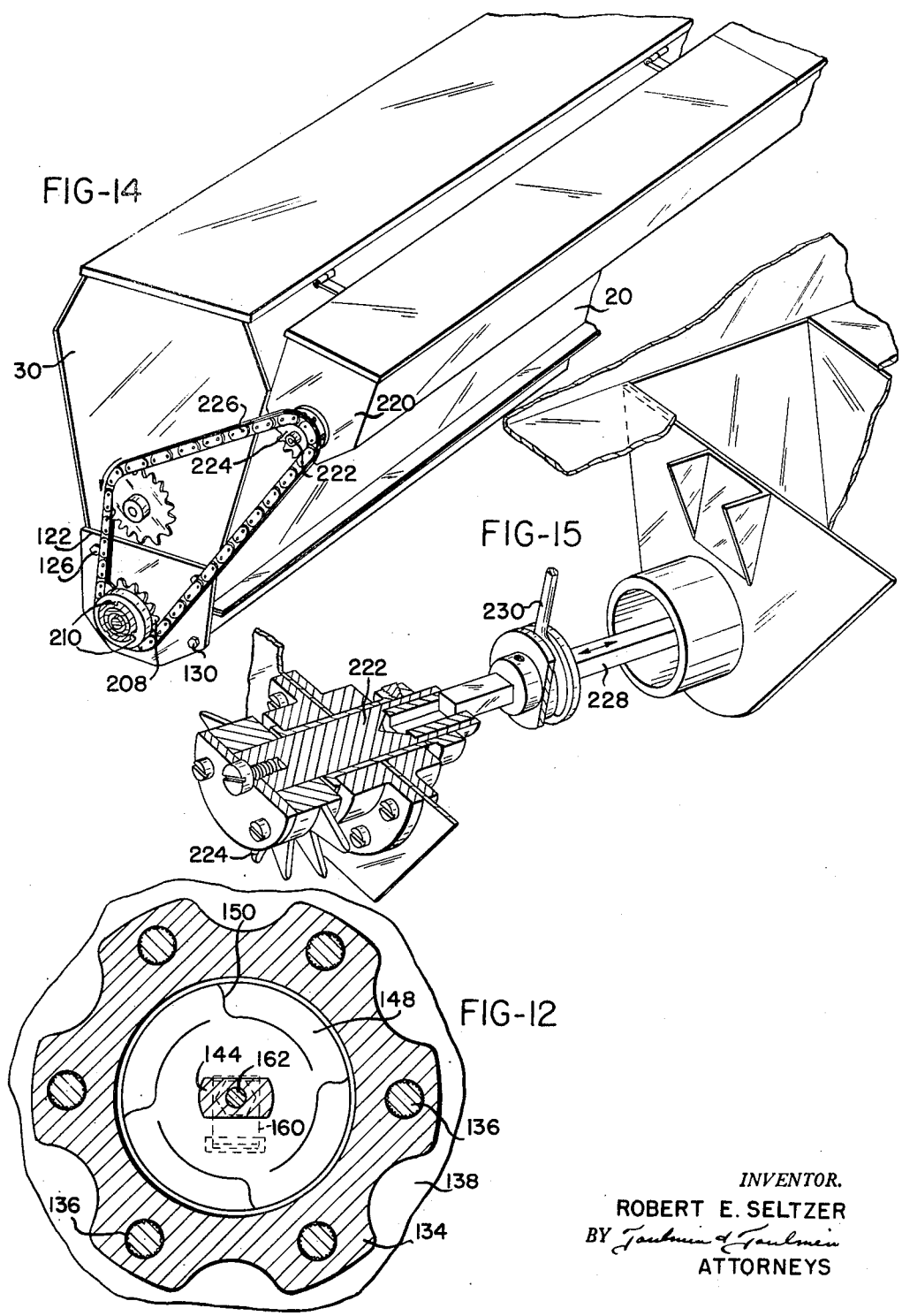

United States Patent Office 2,778,535
Patented Jan. 22, 1957

2,778,535
AGRICULTURAL MATERIAL DISTRIBUTOR

Robert E. Seltzer, Bellevue, Ohio, assignor to Spred-All, Inc., Bellevue, Ohio, a corporation of Ohio Application March 11, 1953, Serial No. 341,640

7 Claims. (Cl. 222—139)

This invention relates to agricultural material distributors somewhat of the type illustrated in my co-pending applications, Serial Nos. 115,595, now Patent No. 2,703,193, issued March 1, 1955, and 331,202, now Patent No. 2,704,624, issued March 22, 1955, and as illustrated in my issued Patent No. 2,624,492. The agricultural material distributor of the present invention represents an advance and improvement thereover.

In the construction of distributors of the general nature with which the present invention is concerned, certain problems arise in constructing a distributor of adequate size to accomplish the work rapidly, in insuring a uniform and constant rate of delivery of material from the distributor, in making the distributor convenient to operate at the same time, and, in observing the foregoing requirements, keep the cost of the unit within competitive limits.

Having the foregoing in mind, it is a primary object of the present invention to provide an improved distributor of the nature referred to which is relatively inexpensive to construct but which exhibits no structural weaknesses that will detract from its operating efficiency and useful life.

A still further object is the provision of a distributor of the nature described having improved mounting means for the agitator shaft thereof which simplifies the construction of the distributor and, at the same time, provides an improved and more accurate support for the shaft.

It is also an object of this invention to provide an improved arrangement for adjusting the slide plate mounted on the bottom of the hopper of the distributor, and which slide plate serves to regulate the rate of discharge of the material from the distributor.

A still further object of this invention is the provision of an arrangement in connection with such a distributor whereby auxiliary distributing units can be mounted thereon and driven in synchronism therewith.

A still further object is the provision of a ground wheel supporting arrangement in a distributor of the nature referred to such that the distance between the wheels can be varied to accommodate the distributor to various spaces between rows of crops to be treated.

These and other objects and advantages of this invention will become more apparent upon reference to the following specification taken in connection with the accompanying drawings, in which:

Figure 3 is a perspective view looking toward the front of the distributor and with part of the hopper broken away to show an internal construction thereof;

Figure 4 is a fragmentary perspective view showing a typical agitator blade according to my invention;

Figure 5 is another perspective view looking in from the front of the distributor and about the center thereof showing details in connection with the mechanism that adjusts the slide plate on the bottom of the hopper;

Figure 6 is a sectional view indicated by line 6—6 on Figure 3 and showing the construction of the bearings that support the inner ends of the agitator shafts of the distributor;

Figure 7 is a perspective view showing details in connection with the forward end of the hitch structure, by means of which draft is applied to the implement;

Figure 8 is a sectional view indicated by mounted plane 8—8—8 on Figure 1 showing the manner in which the hub at one end of the hopper of the implement is mounted thereon;

Figure 9 is a sectional view indicated by mounted plane 9—9—9 on Figure 1 showing details of construction in connection with the hub at one end of the hopper and the drive mechanism embodied thereon. This figure is also indicated by section line 9—9 on Figure 8;

Figure 10 is a fragmentary plan section indicated by line 10—10 on Figure 9;

Figure 11 is a sectional view indicated by line 11—11 on Figure 10;

Figure 12 is a sectional view indicated by line 12—12 on Figure 9 showing a drive element mounted in the hub structure;

Figure 13 is a sectional view indicated by line 13—13 on Figure 9 showing a detachable sprocket member that can be mounted on the hub;

Figure 14 is a fragmentary perspective view showing an auxiliary seeding unit mounted on the back of the hopper and connected for being driven with the distributor; and Figure 15 is a fragmentary perspective view partly in section showing the manner in which the rate of operation of the seeder in Figure 14 can be varied.

Figure 1:
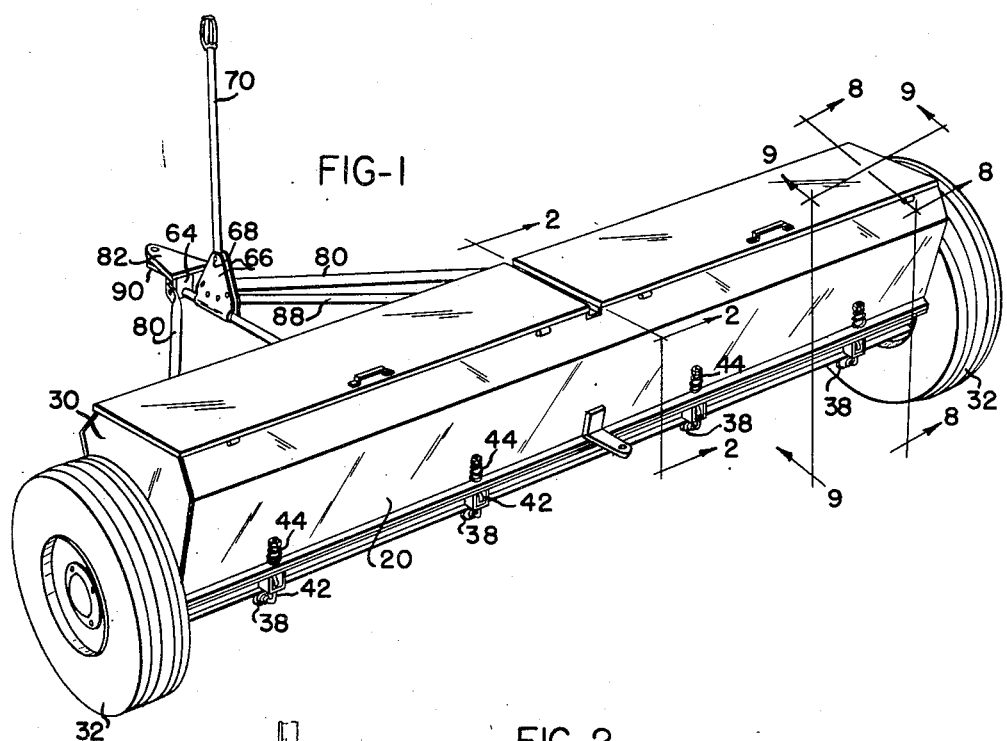
Figure 1 is a perspective view of a distributor constructed according to my invention.
Figure 2:
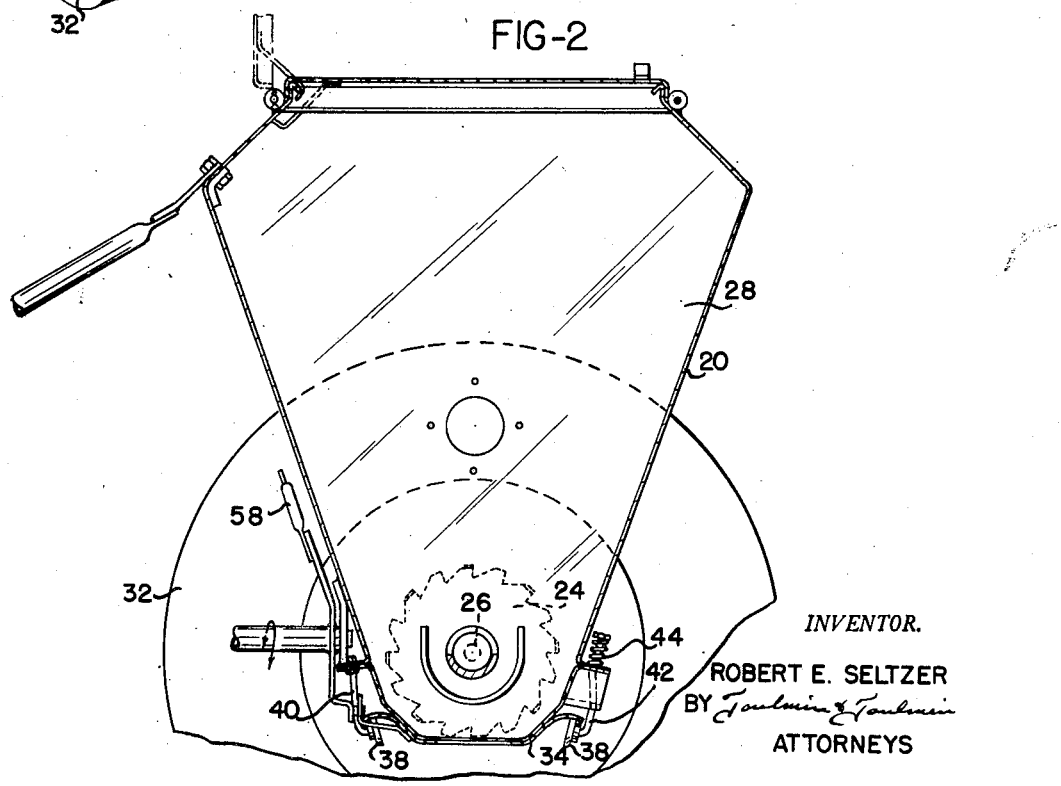
Figure 2 is a transverse section indicated by cutting plane on line 2—2—2 of Figure 1.

Referring to the drawings somewhat more in detail, and particularly to Figures 1 through 5, a distributor constructed according to my invention comprises a hopper 20 for holding the material to be distributed having feed openings 22 on the bottom thereof through which material being distributed is fed by the agitator blades 24 aligned with the feed openings, and which are mounted on the agitator shafts 26 that extend outwardly from center partition 28 of the hopper through the end walls 30 thereof on the axis of the ground wheels 32 for being driven thereby.

Slidably mounted on the bottom of the hopper is a regulating slide plate 34 having openings 36 therein adapted for variable registration for the seed openings 22 for controlling the effective size thereof thereby to control the rate of delivery of material from the hopper. Slide plate 34 is retained in position on the bottom of the hopper by a plurality of sets of rollers 38, of which the ones on the front side of the hopper are rigidly supported on the rods 40 while those on the rear side of the hopper are yieldingly supported on the rods 42 that are urged upwardly by the springs 44.

Reference to Figures 3, 5 and 7 will reveal that about in the middle of slide plate 34 at the front side of the hopper there is mounted a clip 46 having a slot 48 that receives a stud 50 on the lower end of an arm 52 rigidly mounted on stub shaft 54 in the rear end of tubular element 56 extending forwardly from hopper 20.

Arm 52 extends upwardly beyond its connection with stub shaft 54 and comprises a pointer element 58 movable over a scale 60 for indicating to the operator the exact position occupied by slide plate 34.

The extreme forward end of tubular element 56 is also provided with stub shaft 62 rotatably mounted in a plate 64 that is rigidly secured to the forward end of the hitch structure extending from the front of the hopper 20, as will be described presently.

The front end of tubular element 56 also supports rigidly the spaced vertically extending plates 66 that pivotally support, by means of bolt 68, an adjusting lever 70 having a plurality of adjusted to-and-fro positions between plates 66 as determined by the clamp bolt 72 and apertures 74. The pivotal mounting of lever 70 permits it to be located at the most convenient place for the operator while in any position of adjustment thereof while lateral movement of the lever will bring about rocking of tubular element 56 thereby to adjust the slide plate on the bottom of the hopper.

Stop means, as represented by bracket 76 and bolt 78, may be provided in the region of arm 52 for engagement by the arm to determine the maximum adjusted position thereof, or for determining any particular operative setting to which the arm and slide plate can be moved at any desired time.

Referring to the hitch structure extending from the front side of the hopper, this comprises two outer rods or tubing 80 extending from spaced lower points on the front side of the hopper forwardly and inwardly to the region of a generally triangular clevis plate 82 that has secured to the underneath side thereof the anchor plates 84 to which the forward ends of the members 80 are secured by bolts 86. The hitch structure also comprises a center rod or tubular member 88 extending from a point in the center of the hopper toward the top forwardly and downwardly to have its forward end formed upwardly beneath and rigidly connected to clevis plate 82, as will be seen in Figure 7. A bar 90 extending forwardly beneath the forward end of element 88 is provided with aperture means registering with an aperture in the clevis plate 82 thereby forming means for connecting the driven means or implement to the hitch structure. The hitch structure, according to this invention, is simply constructed and is light but provides adequate structure for all circumstances of use of the distributor.

Making reference now to Figures 6 and 8 through 12, the inner ends of the agitator shafts 26 are shouldered as at 100 and have mounted thereon the roller bearings, preferably of the needle type 102, the outer diameters of which correspond with the outer diameters of shafts 26. Closely fitting about the roller bearings 102 and the ends of shafts 26 adjacent thereto are the rubber-like sleeves 104 that are fitted within the metal cups 106 and retained therein by rings 108. For supporting the cups 106, the central partition 28 has an aperture 110 in which is rigidly mounted a half round element 112 on which the said cups rest. The cups are clamped in position on supporting element 112 by the caps 114 and clamping straps 116. The described bearing arrangement not only seals the bearings 102 against foreign material thereby greatly increasing their life, but is inexpensive to construct and simple to assemble and service. Furthermore, the arrangement provides for a degree of resilience sufficient to compensate for minor errors in the manufacture of the various parts of the unit.

The outer ends of shafts 26 extend through the hub structures at the ends of the hopper which are associated with the ground wheels of the unit. Each hub structure, as will be seen in Figures 8 and 9, comprises an inner part 120 having flange means 122 engaging the end wall of the hopper and extending therethrough at the bottom. Nuts 124 on the inside of the hopper adjacent the upper portion of flange 122 receive the bolts 126 while similar nuts 128 secured to the outside of the hopper adjacent the bottom of the flange means receive the bolts 130. The inner part of the hub is thereby rigidly clamped to the adjacent end of the hopper.

The hub also comprises an outer part 132 having flange means 134 which carries the wheel bolts 136 on which a steel wheel 138 is mounted, the said steel wheel forming a part of the ground wheel 132. Each wheel 138 can be reversed on its supporting hub part, and when so reversed there is a substantial difference in the tread distance between the ground wheels for accommodating it to various distances between rows of crops.

The sleeve bearings 140 journal the outer hub part 132 on the inner hub part 120, and a sleeve bearing 142 journals the outer end of corresponding agitator shaft 26 with the inner hub part 120.

The extreme outer end of shaft 26 has a reduced portion 144 with flats thereon on which is a drive disk 146 having a plurality of projections 148, as best seen in Figure 10, that are made up of an axial drive surface 150 and an inclined approach cam 152. As many or as few of the projections 148 as may be desired are provided, but for ordinary purposes four will be sufficient, as illustrated in Figure 12.

In outer hub part 132 there is provided a pin 154 movable axially so as to line the path of the projections 148 so that when the distributor is moved forwardly the pin will be engaged by one of the drive surfaces 150 and the inner or outer hub parts drivingly interconnected.

However, a predetermined reverse movement of the unit will bear one of the cam surfaces 152 against the end of pin 154 to drive it backwardly to its Figure 9 position thereby to interrupt the drive connection between the hub parts. A detent means 156 comprising a spring pressed ball and grooves in pin 154 provide the means for yieldingly retaining the pin in its two operative positions. A rod 158 provides means for manually turning the pin to drive position when so desired.

The drive element 146 is retained on the outer end of shaft 26 by means of a lock washer 160 and bolt 162. Lock washer 160 provides means for locking bolt 162 in any predetermined position of adjustment, and this feature is availed of for axially adjusting shaft 26 within the hopper thereby to bring the agitator blades mounted thereon into precise alignment with the feed openings pertaining thereto.

As will be seen in Figure 6, the agitator blades comprise outwardly bent peripheral portions extending part way through the feed openings and running close to the side edges of the feed openings, and, accordingly, the proper axially positioning of the shaft and agitator blade is extremely important. At the opposite end of inner hub part 120 from the drive element 46 there is a cylindrical recess at the bottom of which there is a thrust washer 164 that is engaged by a collar 166 mounted on shaft 26 and adjustable thereon by means of a set screw 168 in the shaft having an end portion extending into spiral groove 170 in the shaft. The arrangement is such that the shaft can be precisely positioned axially of the hopper and locked in that position while remaining free to rotate. It will be noted, upon reference to Figure 6, that sufficient space is provided between the inner ends of metal cups 106 to provide for axial movement thereof on the supporting element 112.

For certain materials that might be handled by the distributing unit there might be a tendency, particularly in damp weather, to form into clumps thereby necessitating the breaking up thereof before the material is fed from the distributor.

In still other cases a mixture of materials might be placed in the distributor, and too it might be desired to thoroughly admix the materials during operation of the unit. For this purpose there is provided a secondary agitator shaft 200 positioned within the hopper above the regular agitator shafts 26 and carrying the agitator elements 202. Agitator shaft 200 can be formed as a single shaft traversing the entire hopper or can be formed in halves with the inner ends thereof journalled on an intermediate wall 28. In any case, sprocket means 204 is provided on shaft 200 externally of the end of the hopper 20 over which a chain 206 passes that also passes around a sprocket member 208 mounted on the inner end of outer hub part 132 as by means of the splines 210 which will be seen in Figures 9 and 13. The sprocket element 208 can be mounted on or removed from the outer hub part as desired and driven at all times even though the said outer hub part is disconnected from the pertaining shaft 26.

According to the present invention the provision of sprocket element 208 is also availed of for driving an auxiliary seeder unit 220 carried on the back of hopper 20 and having a feed shaft 222 on which is a sprocket 224 drivingly connected by chain 226 with sprocket element 208.

The auxiliary seeder 220 may comprise any suitable and conventional type such as the type in which axially shifting of a shaft, as indicated at 228 in Figure 15 by a shifting member 230, provides the means for varying the rate of delivery of seed therefrom.

The details of construction of the auxiliary seeder form no part of this invention, but, rather, the combination of the material distributor and the auxiliary seeder unit in the manner in which the seeder unit is driven during the operation of the distributor.

It will be understood that this invention is susceptible to modification in order to adapt it to different usages and conditions, and, accordingly, it is desired to comprehend such modifications wtihin this invention as may fall within the scope of the appended claims.

I claim:

1. In an agricultural material distributor; a hopper having feed openings in the bottom, a center partition in said hopper, an agitator shaft extending from the center partition through each side of the hopper and out the end thereof, stationary inner hubs rigid with the ends of the hopper journailing the outer ends of the shafts, outer hubs rotatable on the inner hubs and clutch means to connect the outer hubs with said shafts, ground wheels on said outer hubs for supporting said distributor and for driving said outer hubs, a bearing supporting member secured to said center position, and bearing means for the inner ends of said shafts slidably mounted on said supporting member.

2. In an agricultural material distributor having a hopper having feed openings in the bottom, a center partition in said hopper, an agitator shaft extending from the center partition through each side of the hopper and out the end thereof, bearing structure comprising anti-friction bearings for the inner ends of said shafts, cups surrounding said bearings, means on said center partition supporting said cups, and resilient sleeve means in said cups supporting said bearings therein and telescoping said shafts adjacent the bearings to exclude foreign material therefrom.

3. In an agricultural material distributor having a hopper having feed openings in the bottom, a center partition in said hopper, an agitator shaft extending from the center partition through each side of the hopper and out the end thereof, bearing structure comprising antifriction bearings for the inner ends of said shafts, cups surrounding said bearings, means on said center partition supporting said cups, and resilient sleeve means in said cups supporting said bearings therein and telescoping said shafts adjacent the bearings to exclude foreign material therefrom, the said means supporting said cups comprising an arcuate support shelf extending through said partition, and clamping means clamping said cups thereon.

4. In an agricultural material distributor having a hopper having feed openings in the bottom, a center partition in said hopper, an agitator shaft extending from the center partition through each side of the hopper and out the end thereof, stationary inner hubs rigid with the ends of the hopper journalling the outer ends of the shafts, outer hubs rotatable on the inner hubs and clutch means to connect the outer hubs with said shafts, ground wheels on said outer hubs for supporting said distributor and for driving said outer hubs, the combination of axially spaced bearing means supporting the inner ends of said shafts and axially adjustable, and means retaining said shafts in axially adjusted position in said inner hubs.

5. In an agricultural material distributor, a hopper having feed openings in the bottom, agitator shaft means extending through the hopper having blades thereon cooperating with said openings, inner hubs rigid with the ends of the hopper through which the shaft means extend, outer hubs rotatable on the inner hubs, clutch means for connecting the outer hubs with the shaft means, ground wheels carried by said outer hubs, and spline means on at least one of said outer hub means for detachably receiving a chain drive sprocket.

6. In an agricultural material distributor having a hopper; agitator means in the hopper to feed material therefrom, hubs rotatable on opposite ends of the hopper and ground wheels secured thereto, a seeder detachably secured to the back of the hopper having a drive sprocket, a sprocket detachably mounted on at least one of said hubs and drivingly connected with said drive sprocket, and means for selectively clutching said agitator means to said hubs.

7. An arrangement for rotatably supporting the adjacent ends of a pair of axially aligned shafts comprising a wall member between the ends of the shafts, an aperture in said wall member and aligned with said shafts, anti-friction bearings on the ends of the shafts, cups enclosing said bearings, resilient sleeves within said cups to support said bearings and telescoping said shafts adjacent said bearings, a half round element secured in said aperture and supporting said cups, caps positioned over said cups, and clamping means clamping said caps to said half round element to retain said cups in position.

References Cited in the file of this patent

UNITED STATES PATENTS

| | | |
|---|---|---|
| 330,333 | Kittle | Nov. 10, 1885 |
| 343,193 | Peabody | June 8, 1886 |
| 1,380,925 | Putnam | June 7, 1921 |
| 1,824,234 | Rhodes et al. | Sept. 22, 1931 |
| 2,213,063 | Brink | Aug. 27, 1940 |
| 2,282,625 | Volk | May 12, 1942 |
| 2,318,064 | Delaney | May 4, 1943 |
| 2,469,483 | Strong | May 10, 1949 |
| 2,475,145 | Krause et al. | July 5, 1949 |
| 2,475,971 | Livernois | July 12, 1949 |
| 2,510,231 | Juzwiak | June 6, 1950 |
| 2,522,693 | Stiteler | Sept. 19, 1950 |
| 2,558,352 | Gandrud | June 26, 1951 |
| 2,580,481 | Strehlow | Jan. 1, 1952 |
| 2,603,383 | Wilson | July 15, 1953 |